(12) United States Patent
Adams et al.

(10) Patent No.: US 12,275,615 B2
(45) Date of Patent: Apr. 15, 2025

(54) REEL AND TIP FOR FISH TAPE

(71) Applicant: Milwaukee Electric Tool Corporation, Brookfield, WI (US)

(72) Inventors: Caleb C. Adams, Milwaukee, WI (US); Eric J. Williams, Grafton, WI (US); James A. Cemke, Jr., Hartford, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/453,761

(22) Filed: Aug. 22, 2023

(65) Prior Publication Data

US 2023/0391582 A1 Dec. 7, 2023

Related U.S. Application Data

(63) Continuation of application No. 17/971,175, filed on Oct. 21, 2022, now Pat. No. 11,767,191, which is a
(Continued)

(51) Int. Cl.
*B65H 75/36* (2006.01)
*B65H 75/40* (2006.01)
*H02G 1/08* (2006.01)

(52) U.S. Cl.
CPC ......... *B65H 75/364* (2013.01); *B65H 75/406* (2013.01); *H02G 1/081* (2013.01); *H02G 1/083* (2013.01); *B65H 2701/376* (2013.01)

(58) Field of Classification Search
CPC .............. B65G 75/364; B65G 75/406; B65G 2701/376; B65G 75/4492;
(Continued)

(56) References Cited

U.S. PATENT DOCUMENTS 1,730,993 A * 10/1929 Buchanan .............. H02G 1/081
254/134.3 FT
2,597,706 A * 5/1952 Couchman ............... H02G 1/08
174/68.3
(Continued)

FOREIGN PATENT DOCUMENTS

| CN | 2098747 | 3/1992 |
|---|---|---|
| CN | 1599168 | 3/2005 |

(Continued)

OTHER PUBLICATIONS

International Search Report and Written Opinion for International Application No. PCT/US2019/020774, dated Jun. 17, 2019, 9 pages.

*Primary Examiner* — William A. Rivera
(74) *Attorney, Agent, or Firm* — Reinhart Boerner Van Deuren s.c.

(57) ABSTRACT

Described herein is a fish tape reel comprising a housing with two side shells coupled together. The housing defines an internal cavity. An internal portion of the housing defines a plurality of flat gripping portions and a plurality of finger notches. The housing comprises a plurality of tabs in the internal cavity, the tabs interfacing against an inner annular portion that is coupled to the handle when the handle rotates around the housing.

19 Claims, 11 Drawing Sheets

Related U.S. Application Data continuation of application No. 16/359,689, filed on Mar. 20, 2019, now Pat. No. 11,479,440, which is a continuation of application No. PCT/US2019/020774, filed on Mar. 5, 2019.

(60) Provisional application No. 62/639,074, filed on Mar. 6, 2018.

(58) Field of Classification Search
CPC .......... B65G 2402/412; B65G 2407/22; H02G 1/081; H02G 1/083; H02G 11/02; H02G 1/085
See application file for complete search history.

(56) References Cited

U.S. PATENT DOCUMENTS

| | | | |
|---|---|---|---|
| 2,750,152 A | 6/1956 | Schinske | |
| 3,424,435 A | 1/1969 | Niemann | |
| 3,549,127 A | 12/1970 | Niemann | |
| 3,582,044 A | 6/1971 | Gardner | |
| 3,858,848 A | 1/1975 | MacFetrich | |
| 5,110,092 A * | 5/1992 | Blaha | B65H 75/18 254/134.3 FT |
| 5,280,861 A | 1/1994 | Corriveau | |
| 5,423,516 A | 6/1995 | Blaha | |
| 5,938,180 A | 8/1999 | Walsten | |
| 6,152,395 A | 11/2000 | Corriveau et al. | |
| 6,319,618 B1 * | 11/2001 | Kelley | H02G 1/083 254/134.3 FT |
| 6,361,021 B1 * | 3/2002 | Brennan | B65H 75/305 254/134.3 FT |
| 6,722,603 B1 | 4/2004 | Atencio | |
| 6,896,242 B1 | 5/2005 | Konen | |
| 7,044,415 B2 | 5/2006 | Wiesemann et al. | |
| 7,100,900 B2 * | 9/2006 | Radle | H02G 1/083 254/134.3 FT |
| 8,496,229 B1 | 7/2013 | Mayhall | |
| 8,657,259 B2 * | 2/2014 | Pagliaroli | H02G 1/081 254/134.3 R |
| 10,797,474 B1 * | 10/2020 | Hall | H02G 1/083 |
| 11,479,440 B2 | 10/2022 | Adams et al. | |
| 2005/0062028 A1 | 3/2005 | Konen | |
| 2006/0065883 A1 | 3/2006 | Radle et al. | |
| 2007/0001157 A1 * | 1/2007 | Quick | H02G 1/081 254/134.3 FT |
| 2007/0187659 A1 | 8/2007 | Wiesemann et al. | |
| 2009/0159862 A1 | 6/2009 | Wong et al. | |
| 2011/0140058 A1 * | 6/2011 | Pagliaroli | H02G 1/081 254/134.3 FT |
| 2011/0155839 A1 | 6/2011 | Wells | |
| 2012/0187353 A1 * | 7/2012 | Haslacher | H02G 1/083 254/134.3 FT |
| 2016/0096705 A1 | 4/2016 | Ryals | |
| 2019/0292005 A1 | 9/2019 | Miller et al. | |
| 2019/0292009 A1 | 9/2019 | Gonsalves | |
| 2021/0155445 A1 * | 5/2021 | Pearson | B65H 75/406 |

FOREIGN PATENT DOCUMENTS

| | | |
|---|---|---|
| CN | 201230171 | 4/2009 |
| CN | 202833647 | 3/2013 |
| KR | 10-2017-0106885 | 9/2017 |

* cited by examiner

REEL AND TIP FOR FISH TAPE

CROSS-REFERENCE TO RELATED PATENT APPLICATIONS

This application is a continuation of U.S. application Ser. No. 17/971,175, filed Oct. 21, 2022, which is a continuation of U.S. application Ser. No. 16/359,689, now U.S. Pat. No. 11,479,440, filed Mar. 20, 2019, which is a continuation of International Application No. PCT/US2019/020774, filed Mar. 5, 2019, which claims priority from U.S. Application No. 62/639,074, filed Mar. 6, 2018, the contents of each of which are incorporated herein in their entireties.

BACKGROUND OF THE INVENTION

Fish tape is dispensed out from a fish tape reel to be pushed through spaces such as conduit for running wire through the space. Fish tape includes a tip to hold and move a wire with the fish tape.

SUMMARY OF THE INVENTION

In one embodiment, a fish tape reel comprises a housing comprising a central axis, an outer wall, an inner wall radially surrounding the central axis, a plurality of tabs radially surrounding the inner wall, an inner annular portion located between the plurality of tabs and the outer wall, a handle coupled to the inner annular portion, a fish tape wound around the inner wall, and a fish tape tip coupled to an end of the fish tape. The inner wall, the housing, and the plurality of tabs define an internal cavity. The handle and inner annular portion are configured to collectively rotate around the central axis of the housing. The inner annular portion interfaces against the plurality of tabs and the outer wall when the handle and the inner annular portion rotate around the central axis.

In another embodiment, a fish tape reel comprises a housing comprising a first side portion, a second side portion and a central axis, an outer wall, an inner wall radially surrounding the central axis, a plurality of sets of tabs (e.g., at least 10) radially surrounding the inner wall, an inner annular portion located between the sets of tabs and the outer wall, a handle coupled to the inner annular portion, an elongate structure (e.g., a fish tape) coupled to the housing and wound around the inner wall, and a tip coupled to an end of the elongate structure. The inner wall, the housing, and the sets of tabs define an internal cavity. Each set of tabs comprises a first tab that extends from the first side portion and a second tab that extends from the second side portion. Each of the tabs in the first and second sets of tabs extend towards each other. The handle and inner annular portion are configured to collectively rotate around the central axis of the housing. The inner annular portion interfaces against the sets of tabs and the outer wall when the handle and the inner annular portion rotate around the central axis.

The tip comprises a longitudinal axis, a cylindrical portion centered around the longitudinal axis, a second end opposite the first end, and first and second legs that couple the first end to the second end. The cylindrical portion comprises a first end coupled to the elongate structure and the second end comprises a rounded tip. A through-hole is defined by the first and second ends and the first and second legs. The through-hole comprises a first semi-circular rounded edge defined by the first end, a second semi-circular rounded edge defined by the second end, a third rounded edge defined by the first leg, and a fourth rounded edge defined by the second leg. The through-hole extends perpendicularly to the tip longitudinal axis.

In another embodiment a fish tape reel comprises a housing comprising a central axis, an outer wall, an inner wall radially surrounding the central axis, a plurality of tabs radially surrounding the inner wall, an inner annular portion located between the plurality of tabs and the outer wall, a handle comprising a channel and coupled to the inner annular portion, an elongate structure wound around the inner wall and extending through the handle channel, and a tip coupled to an end of the elongate structure. The inner wall and the plurality of tabs define an internal cavity. The handle and inner annular portion are configured to collectively rotate around the central axis of the housing. The inner annular portion interfaces against the plurality of tabs and the outer wall when the handle and the inner annular portion rotate around the central axis. The tip comprises a longitudinal axis and a cylindrical portion centered around the tip longitudinal axis. The cylindrical portion comprises a first end coupled to the elongate structure, a second end opposite the first end, the second end comprising a rounded tip, and first and second legs that couple the first end to the second end. A through-hole is defined by the first and second ends and the first and second legs.

The present disclosure provides, in one aspect, a fish tape reel comprising a housing including a first side shell coupled to a second side shell. An internal cavity is defined between the first and second side shells. The housing defines a circumferential slot between the first and second side shells at an outer edge of the housing. The housing defines a plurality of flat gripping portions and a plurality of finger notches therebetween on an inner edge of the housing. The housing includes a plurality of tabs in the internal cavity, each tab defining a slot between the tab and the outer edge of the housing. A handle is rotatably coupled to the housing between the first side shell and the second side shell. The handle includes a grip portion and an inner annular portion, the inner annular portion arranged in the plurality of slots between the plurality of tabs and the outer edge of the housing. The grip portion is arranged outside the housing and has a pistol grip, a top grip, and a tape exit grip. The tape exit grip defines an opening aligned with the slot of the housing, the opening extending through inner annular portion and the tape exit portion.

The present disclosure provides, in another aspect, a fish tape reel comprising a housing including a first side shell coupled to a second side shell. An internal cavity is defined between the first and second side shells. The housing defines a circumferential slot between the first and second side shells at an outer edge of the housing. The housing defines a plurality of flat gripping portions and a plurality of finger notches therebetween on an inner edge of the housing. A handle is rotatably coupled to the housing between the first side shell and the second side shell. The handle includes a grip portion and an inner annular portion, the inner annular portion arranged in internal cavity. The grip portion is arranged outside the housing and has a pistol grip, a top grip, and a tape exit grip. The tape exit grip defines an opening aligned with the slot of the housing, the opening extending through inner annular portion and the tape exit portion.

The present disclosure provides, in yet another aspect, a housing including a first side shell coupled to a second side shell. An internal cavity is defined between the first and second side shells. The housing defines a circumferential slot between the first and second side shells at an outer edge of the housing. The housing includes a plurality of tabs in the internal cavity, each tab defining a slot between the tab and the outer edge of the housing. A handle is rotatably coupled to the housing between the first side shell and the second side shell. The handle includes a grip portion and an inner annular portion. The inner annular portion is arranged in the plurality of slots between the plurality of tabs and the outer edge of the housing. The handle portion is arranged outside the housing. The handle defines an opening aligned with the slot of the housing, the opening extending through inner annular portion and the handle portion.

The present disclosure provides, in yet another aspect, a fish tape tip configured to be arranged at an end of a length of fish tape. The fish tape tip comprises a body defining a longitudinal axis, the body having a first end configured to be coupled to the end of the length of fish tape and an opposite second end. The first end is coupled to the second end by first and second legs, wherein a through-hole extending transverse to the longitudinal axis is defined between the two legs. A first semi-circular portion is defined by the first end and extends between the first and second legs and a second semi-circular portion is defined by the second end and extends between the first and second legs. Rounded edges are defined along at least a portion of the first semi-circular portion, the first leg, the second semi-circular portion, and the second leg.

The present disclosure provides, in yet another aspect, a fish tape tip configured to be arranged at an end of a length of fish tape. The fish tape tip comprises a body defining a longitudinal axis, the body having a first end configured to be coupled to the end of the length of fish tape and an opposite second end defining a half-sphere with a diameter. The first end is coupled to the second end by first and second legs, each leg having a height that is less than the diameter. A through-hole extending transverse to the longitudinal axis is defined between the two legs. A first semi-circular portion is defined by the first end, extends between the first and second legs, and tapers from the diameter to the height of the legs. A second semi-circular portion is defined by the second end, extends between the first and second legs, and tapers from the diameter to the height of the legs. Rounded edges are defined along at least a portion of the first semi-circular portion, the first leg, the second semi-circular portion, and the second leg.

The present disclosure provides, in yet another aspect, an end for a length of metal fish tape. The end comprises a first end, an opposite second end, and a body in between the first and second ends. The second end is secured to the body portion at a secured point to define a loop forming a through-hole.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
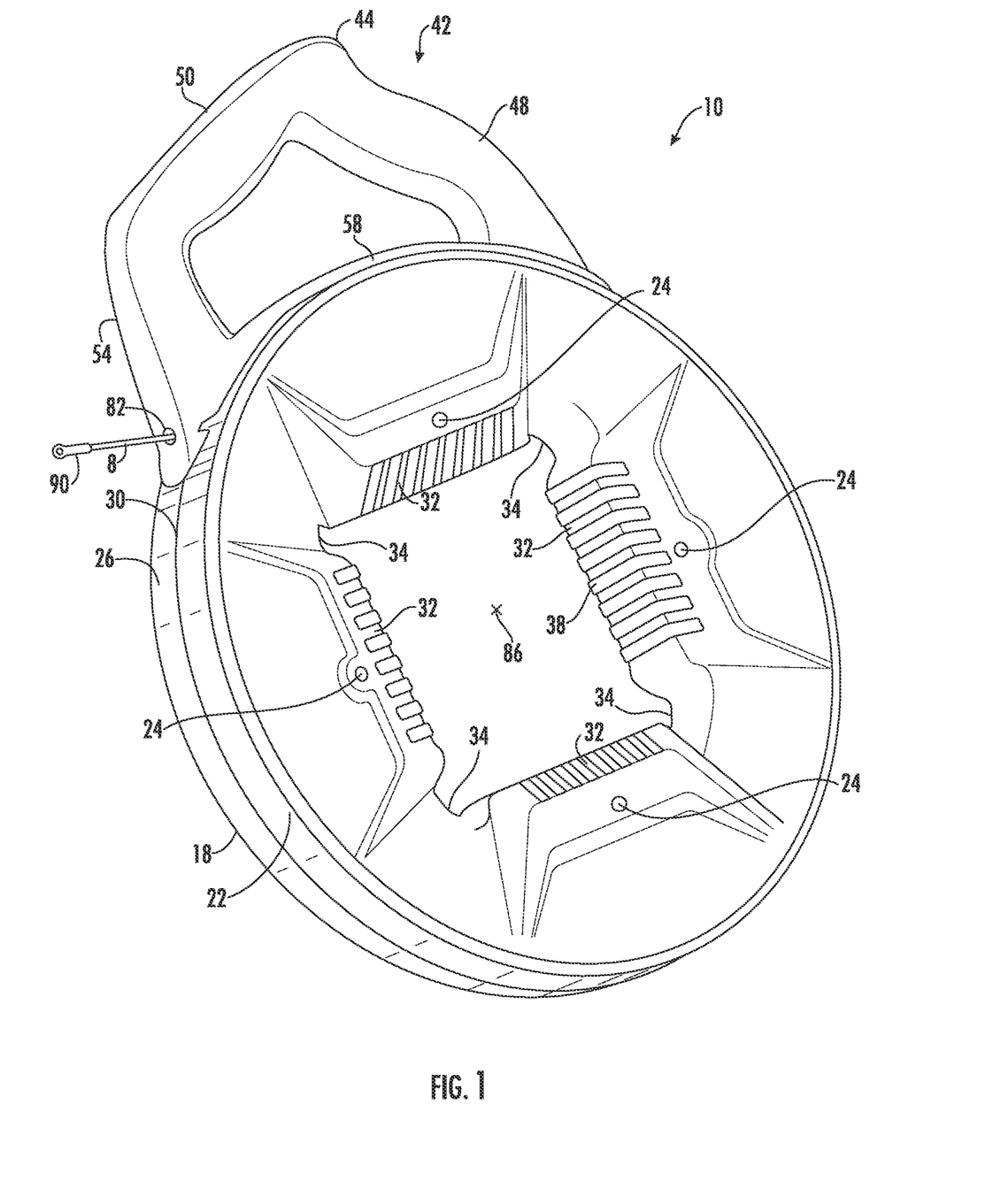
FIG. 1 is a perspective view of a fish tape reel, according to an embodiment.
Figure 2:
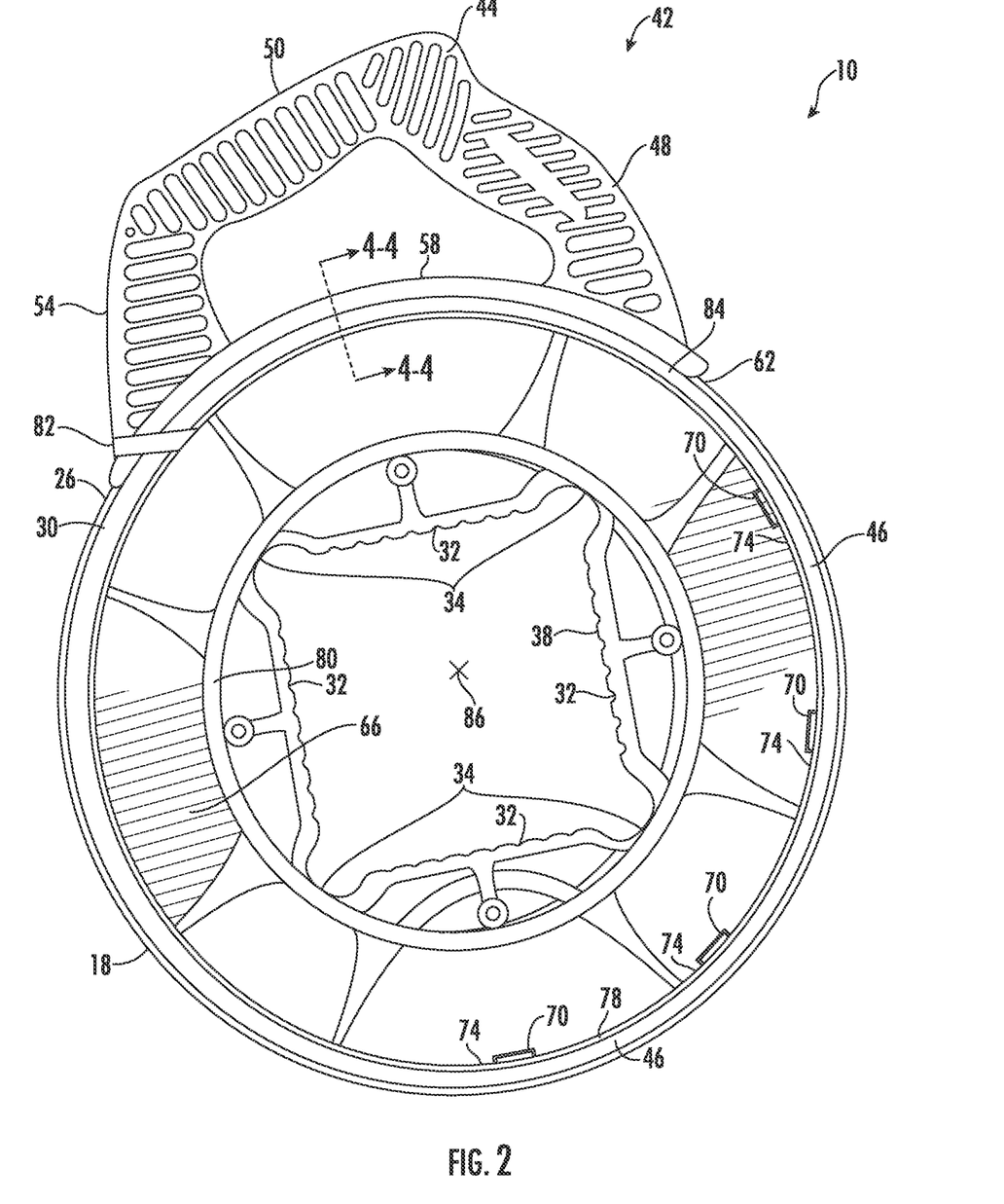
FIG. 2 is a perspective view of the fish tape reel of FIG. 1 with a side shell removed, according to an embodiment.

As shown in FIGS. 1 and 2, a reel 10 for a length of an elongate structure, shown as fish tape 8, comprises a housing 14 including a first side shell 18 coupled to a second side shell 22 via fasteners 24. The housing 14 has an outer edge 26 that defines a circumferential slot 30 between the first and second side shells 18, 22. The housing 14 includes a plurality of flat gripping portions 32 and a plurality of finger notches 34 therebetween on an inner edge 38 of the housing 14. Fish tape 8 extends through opening 82, also referred to as a channel.

Figure 3:
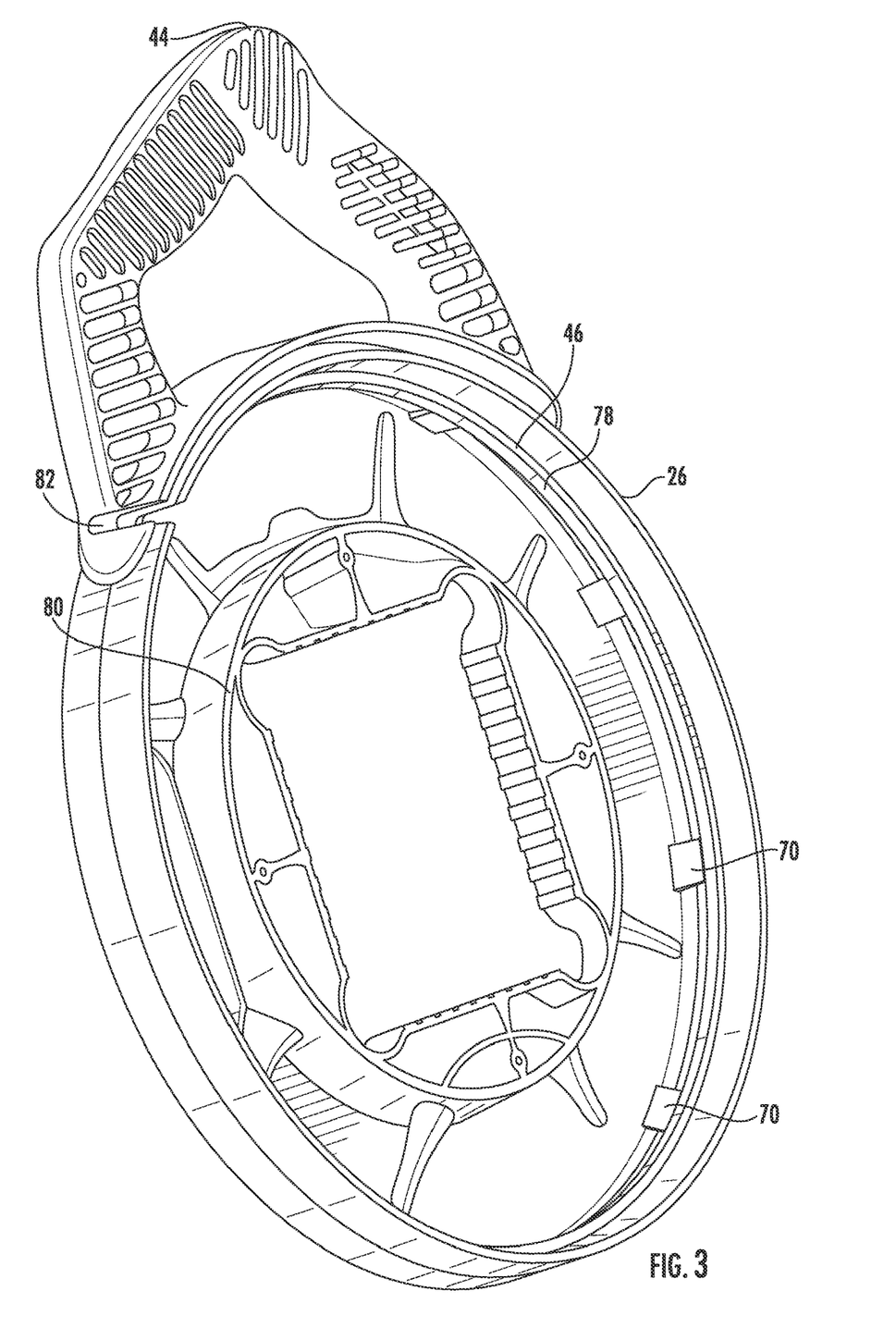
FIG. 3 is a perspective view of the fish tape reel of FIG. 1 with a side shell removed, according to an embodiment.
Figure 4:
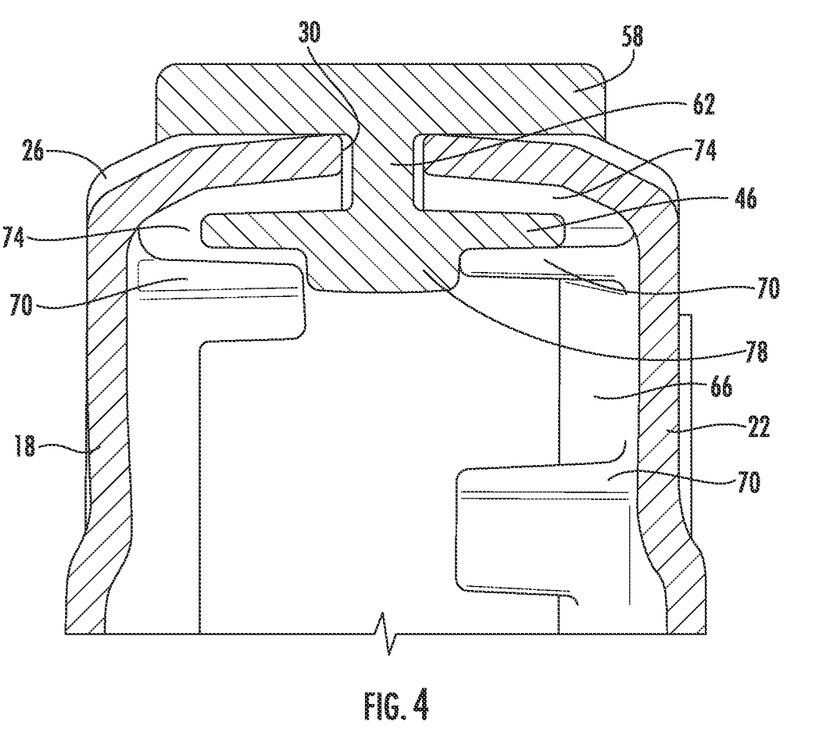
FIG. 4 is a cross sectional view of the fish tape reel of FIG. 1, according to an embodiment.

As shown in FIGS. 2-4, the reel 10 includes a handle 42 with a grip portion 44 and an inner annular portion 46. The grip portion 44 includes a pistol grip 48, a top grip 50, a tape exit grip 54, and a bridge 58 that connects the pistol grip 48 and tape exit grip 54. Inner annular portion 46 is coupled to the grip portion 44 via a neck 62 that is nominally smaller than a width of the circumferential slot 30. The neck 62 extends along the length of the bridge 58 between the inner annular portion 46 and the bridge 58. As can be seen in FIG. 4, the bridge 58 is slightly wider than the inner annular portion 46, and the inner annular portion 46 is wider than the neck 62.

As shown in FIGS. 2-4, an internal cavity 66 is defined between the first and second side shells 18, 22. Each of the first and second side shells 18, 22 includes a plurality of tabs 70 in the internal cavity 66 extending alongside the outer edge 26. A slot 74 is defined between each tab 70 and the outer edge 26, also referred to as an outer wall. During assembly, the inner annular portion 46 is fit within the plurality of slots 74 defined between the plurality of tabs 70 and the outer edge 26, the neck 62 is arranged in the circumferential slot 30, and the bridge 58 is arranged on the outer edge 26. In the illustrated embodiment, there are ten total tabs 70, but in other embodiments there may be more or fewer tabs 70. As shown in FIG. 4, each tab 70 extends to nearly abut an extension 78 of the inner annular portion 46, with the extension 78 protruding from the inner annular portion 46 radially inwards towards central axis 86. As inner annular portion 46 rotates with respect to housing 14, extension 78 selectively is disposed between tabs extending from either of first and second side shells 18, 22. Each of the first and second side shells 18, 22 defines an inner rim 80, also referred to as an inner wall, in the internal cavity 66. When the first and second side shells 18, 22 are fastened together, the inner rims 80 come together to form an inner spool 84, also referred to as inner spool 84, upon which the length of fish tape 8 is wound within the internal cavity 66, between the inner rims 80 and plurality of tabs 70. The plurality of tabs 70 radially surround inner spool 84.

Figure 15:
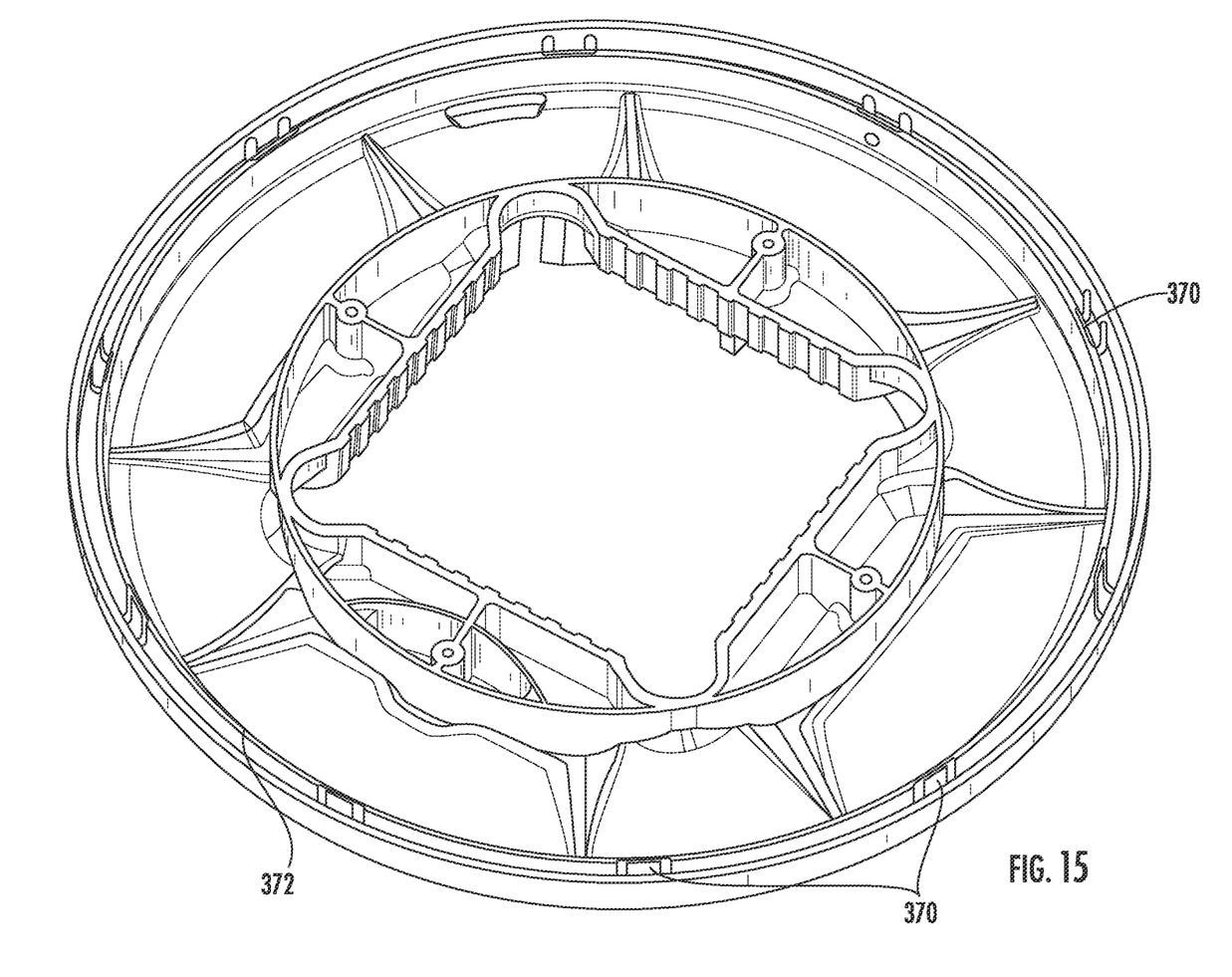
FIG. 15 is a perspective view of a portion of a fish tape reel, according to an embodiment.
Figure 16:
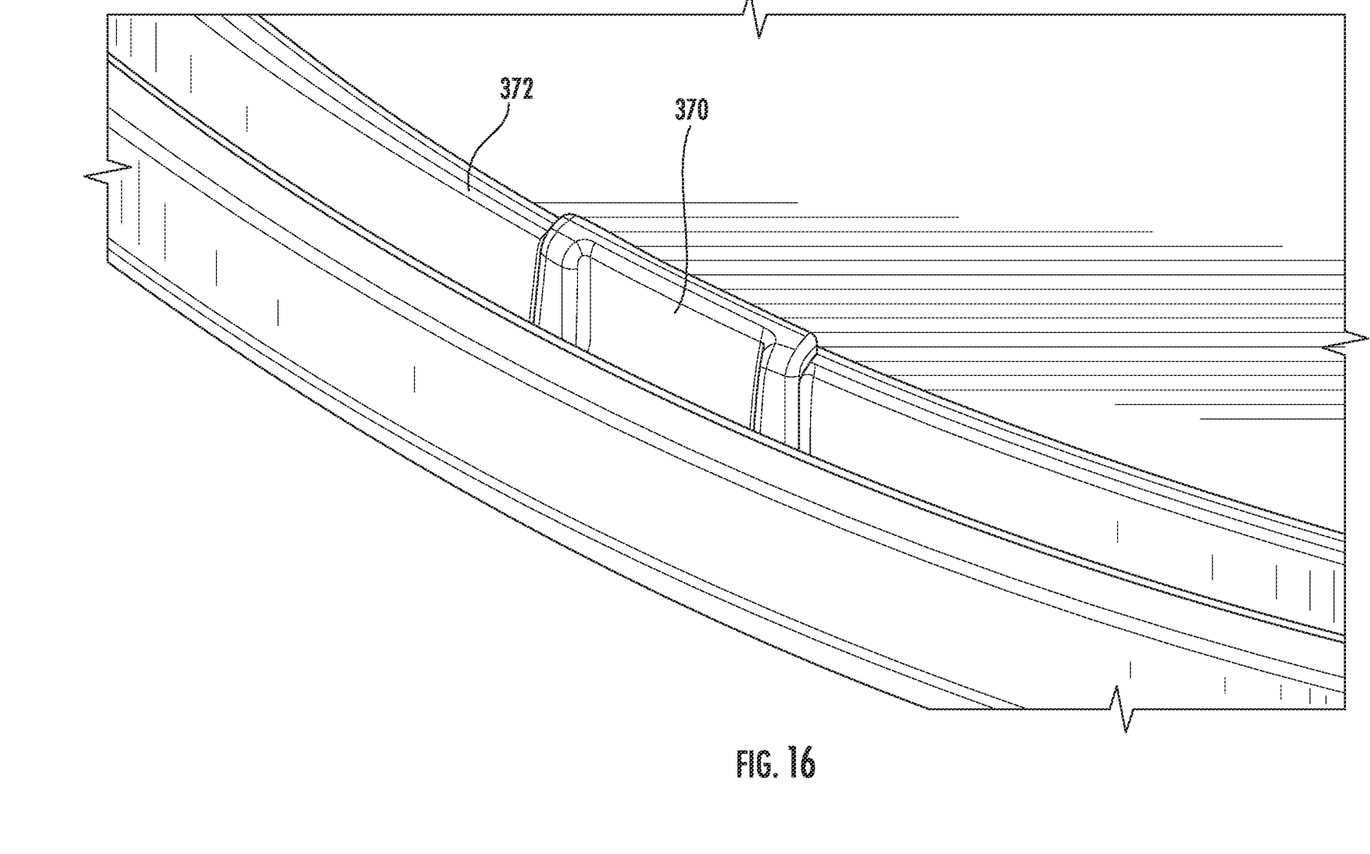
FIG. 16 is an enlarged view of a portion of the fish tape reel of FIG. 15, according to an embodiment.

In an alternative embodiment shown in FIGS. 15 and 16, tabs 370 are connected with annular rings 372 that supports the tabs 370 and prevents the tabs 370 from deforming or bending. Each of first and second side shells 18, 22 comprise annular rings 372. The tabs 370 contact the inner annular portion 46 of the handle 42 but the ring 372 does not contact the inner annular portion 46. In other words, the inner annular portion 46 is just supported by the tabs 370 (twelve tabs in illustrated embodiment) rather than the entire ring 372, thereby reducing friction as the inner annular portion 46 moves within the housing 14.

In one or more embodiments tabs 370 comprise sets of tabs, a first subset of tabs 70 extending from the first side shell 18 and a second subset of tabs 70 extending from the second side shell 22. In at least one embodiment, each tab in a respective set of tabs extends toward a tab in the other set of tabs. In various embodiments the reel 10 comprises ten tabs 370, at least ten tabs 370, twelve tabs 370, and at least twelve tabs 370. In one embodiment tabs 70 from each of first and second side shells 18, 22 protrude towards respective tabs on the other of first and second side shells 18, 22, although it is contemplated herein that tabs 70 on first and second side shells 18, 22 may be staggered with respect to each other.

Figure 5:
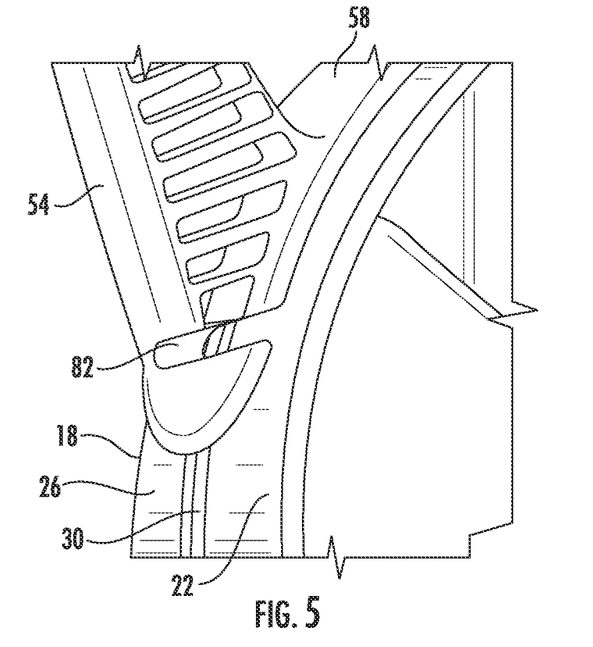
FIG. 5 is an enlarged perspective view of the fish tape reel of FIG. 1, according to an embodiment.
Figure 6:
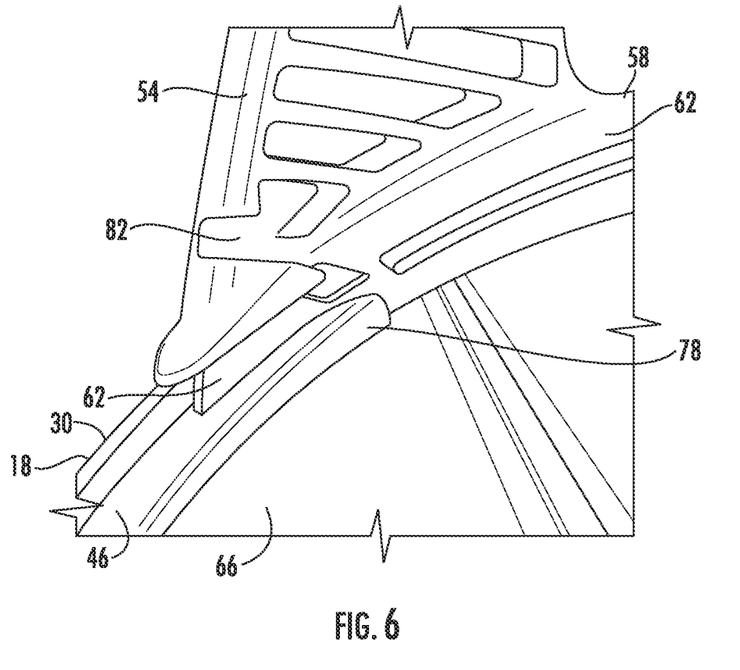
FIG. 6 is an enlarged perspective view of the fish tape reel of FIG. 1 with a side shell removed, according to an embodiment.

Referring to FIGS. 5 and 6, the tape exit grip 54 defines an opening 82 aligned with the circumferential slot 30. As shown in FIG. 6, the opening 82 extends through the tape exit grip 54, the neck 62, the inner annular portion 46, and the extension 78. The opening 82 is configured to permit the length of fish tape to be either fed from the internal cavity 66 or retracted into the internal cavity 66 via the opening 82 and the circumferential slot 30.

In operation, an operator may pick up the reel 10 by grasping the pistol grip 48, the top grip 50, or the tape exit grip 54 of the grip portion 44 of the handle 42 with a first hand. The operator may then grasp the housing 14 by grabbing one of the flat gripping portions 32 with a second hand and placing one or more fingers of the second hand in the finger notches 34 on the inner edge 38 of the housing 14. The flat gripping portions are easy to hold compared to a housing with a purely annular inner edge. If the operator is feeding fish tape from the reel, the operator may rotate the housing 14 counterclockwise as viewed in FIG. 2 while firmly holding the handle 42. Because the operator is holding the handle 42 with the first hand, the housing 14 rotates relative to the handle 42 about a central axis 86. The finger notches 34 make it easy for the operator to grasp the housing 14 and easier to rotate the housing 14 with one finger of the second hand while holding the grip portion 44 with the first hand.

As the housing 14 rotates relative to the handle 42, the inner annular portion 46 of the handle slides along the slots 74 defined between the plurality of tabs 70 and the outer edge 26 and the neck 62 slides within the circumferential slot 30. Because the housing 14 utilizes a plurality of individual tabs 70, 370, which define a plurality of distinct points of interfacing contact with the inner annular portion 46 instead of a continuous 360 degree ring to support the inner annular portion 46, the reduction in contact surface area between the inner annular portion 46 and the housing 14 reduces friction and the effort it takes to rotate the housing 14 while holding the handle 42.

If the operator desires to feed fish tape out from the reel 10, the operator rotates the housing 14 counterclockwise relative to the handle 42 as viewed in FIGS. 1 and 2. The length of fish tape rotates with the housing 14 because it is coiled around the inner spool 84 formed by the inner rims 80. However, because an end of the fish tape is arranged outside the housing 14 through opening 82, as the housing 14 rotates counterclockwise, the remainder of the length of fish tape is forced out through the circumferential slot 30 and the opening 82. If the operator desires to retract fish tape back into the reel 10, the operator rotates the housing 14 clockwise relative to the handle 42 as viewed in FIGS. 1 and 2, which causes the fish tape to be retracted in through the opening 82 and circumferential slot 30. The extension 78 of the inner annular portion 46 prevents the fish tape from becoming caught or rubbing between opposite tabs 70, 370 of the first and second side shells 18, 22. Thus, as the fish tape exits or enters the opening 82, friction is reduced and the fish tape exist and enters the housing 14 more smoothly.

Figure 7:
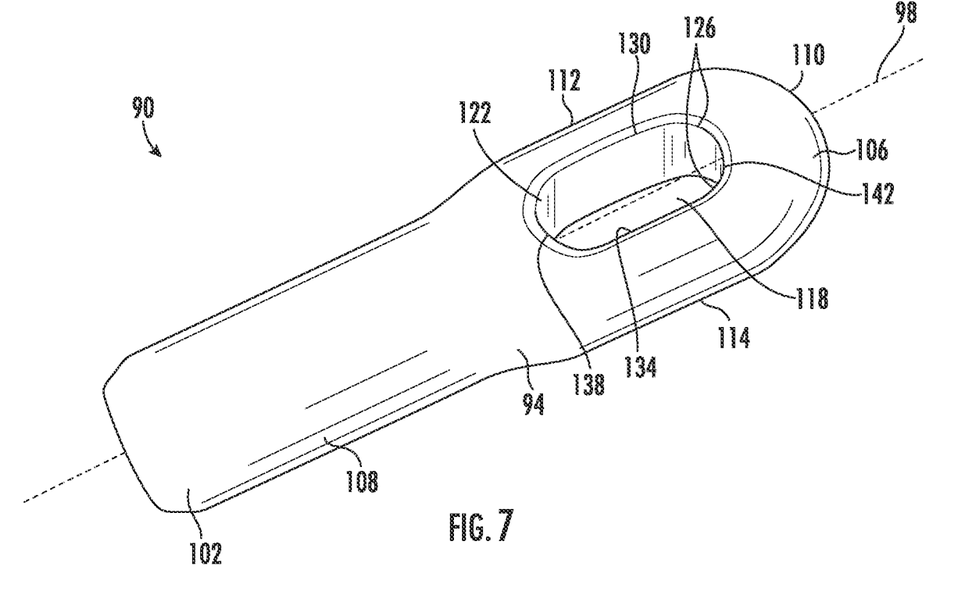
FIG. 7 is a perspective view of a tip for fish tape, according to an embodiment.
Figure 8:
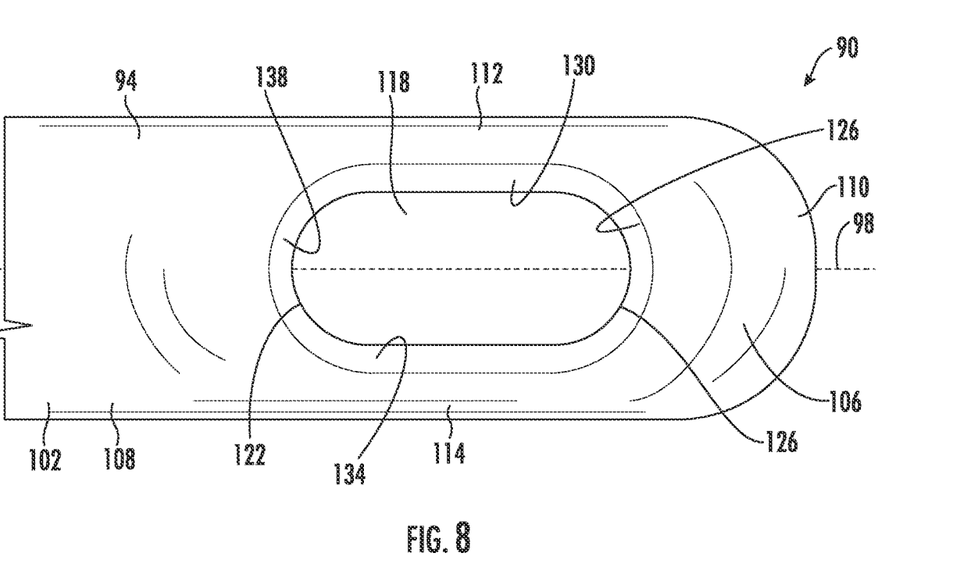
FIG. 8 is a top plan view of the tip of FIG. 7, according to an embodiment.

As shown in FIGS. 7 and 8, a tip 90 for a length of fish tape has a body 94 defining a longitudinal axis 98. The body 94 has a first end 102 configured to be coupled to an end of a length of fish tape and an opposite second end 106. The first end 102 has a cylindrical portion 108 and the second end 106 has a rounded tip 110. The first end 102 is connected to the second end 106 by first and second legs 112, 114 which extend parallel to the longitudinal axis 98. A through hole 118 is defined between the first and second legs 112, 114 and the first and second ends 102, 106 and extends in a direction transverse to the longitudinal axis 98. The through hole 118 is configured to permit a section of wire to pass through and be secured to the tip 90.

A first semi-circular portion 122 is defined by the first end 102 and extends between the first and second legs 112, 114, and a second semi-circular portion 126 is defined by the second end 106 and extends between the first and second legs 112, 114. There are two first semi-circular portions 122 and two second semi-circular portions 126, with one respectively on each side of the tip 90. Each of the first and second legs 112, 114 and first and second semi-circular portions 122, 126 respectively define rounded edges 130, 134, 138, 142.

In the illustrated embodiment, the rounded edges 130, 134, 138, 142 respectively extend continuously along the entire lengths of the first and second legs 112, 114 and first and second semi-circular portions 122, 126, thus forming one long rounded edge. However, in other embodiments, the rounded edges 130, 134, 138, 142 may only extend along a portion of the lengths. In operation, the rounded edges 130, 134, 138, 142 provide smooth transition points that allow the tip 90 to glide and slide while being fed through long, complex conduit runs.

Figure 9:
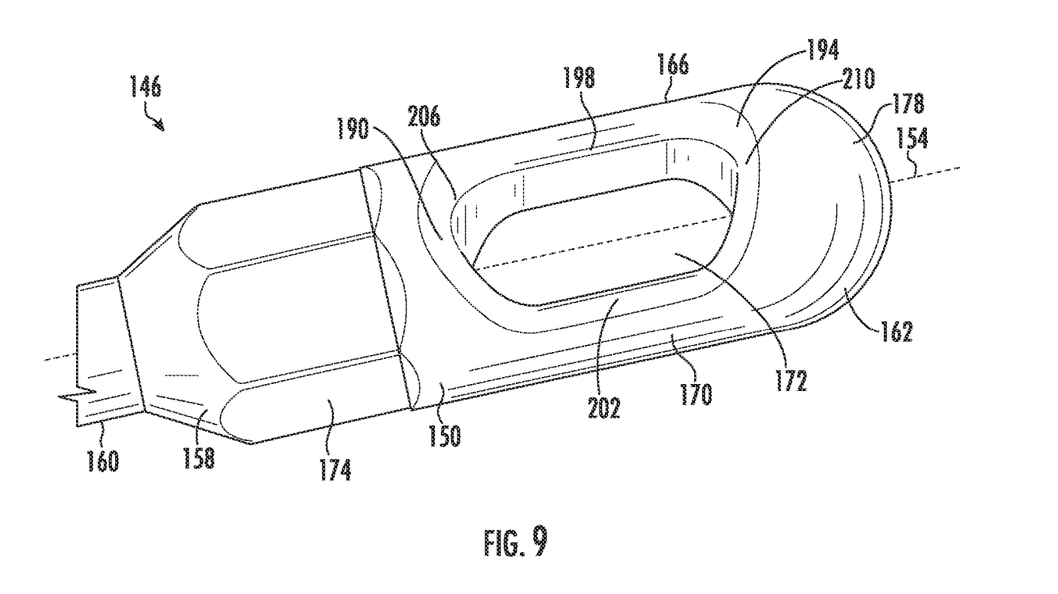
FIG. 9 is a perspective view of a tip for fish tape, according to an embodiment.
Figure 10:
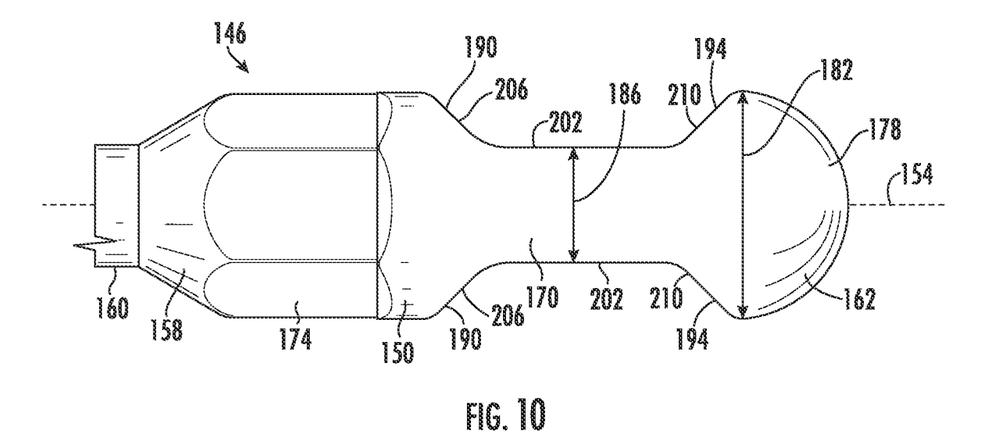
FIG. 10 is a side plan view of the tip of FIG. 9, according to an embodiment.
Figure 11:
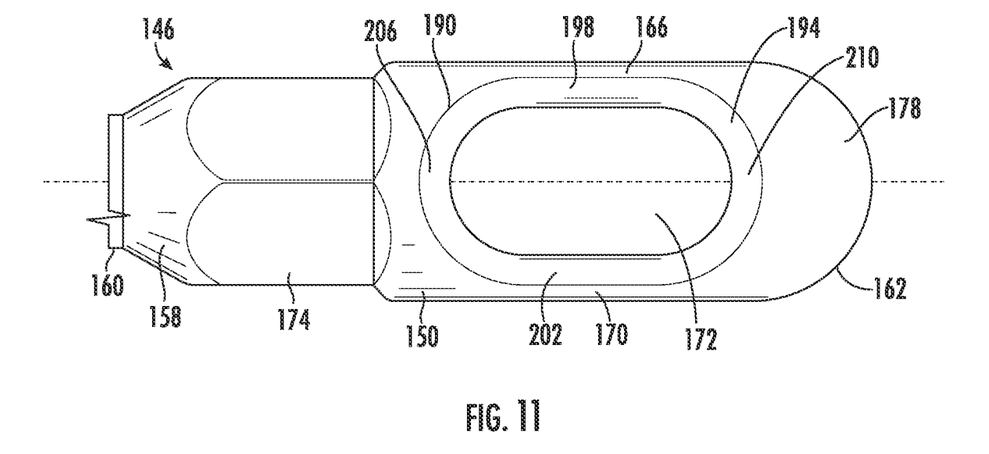
FIG. 11 is a top plan view of the tip of FIG. 9, according to an embodiment.

As shown in FIGS. 9-11, another tip 146 for a length of fish tape has a body 150 defining a longitudinal axis 154. The body 150 has a first end 158 configured to be coupled to an end 160 of a length of the fish tape and an opposite second end 162. The first end 158 is connected to the second end 162 by first and second legs 166, 170 which extend parallel to the longitudinal axis 154. A through hole 172 is defined between the first and second legs 166, 170 and the first and second ends 158, 162 and extends in a direction transverse to the longitudinal axis 154. The through hole 172 is configured to permit a section of wire to pass through and be secured to the tip 146.

The first end 158 has a hexagonal portion 174 and the second end 162 defines a half-sphere 178 having a diameter 182. The first and second legs 166, 170 each have a height 186 that is less than the diameter of the half-sphere 178. A first semi-circular portion 190 is defined by the first end 158. The first semi-circular portion 190 extends between the first and second legs 166, 170 and tapers from the diameter 182 to the height 186 of the legs. A second semi-circular portion 194 is defined by the second end 162. The second semi-circular portion 194 extends between the first and second legs 166, 170, and tapers from the diameter 182 to the height 186 of the legs. As shown in FIG. 10, there are two first semi-circular portions 190 and two second semi-circular portions 194, with one respectively on each side of the tip 146.

As shown in FIGS. 9-11, each of the first and second legs 166, 170 and first and second semi-circular portions 190, 194 respectively define rounded edges 198, 202, 206, 210. In the illustrated embodiment, the rounded edges 198, 202, 206, 210 respectively extend continuously along the entire lengths of the first and second legs 166, 170 and first and second semi-circular portions 190, 194, thus forming one long rounded edge. However, in other embodiments, the rounded edges 198, 202, 206, 210 may only extend along a portion of the lengths. In operation, the half-sphere 178 and the rounded edges 198, 202, 206, 210 provide smooth transition points that allow the tip 146 to glide and slide while being fed through long, complex conduit runs.

Figure 12:
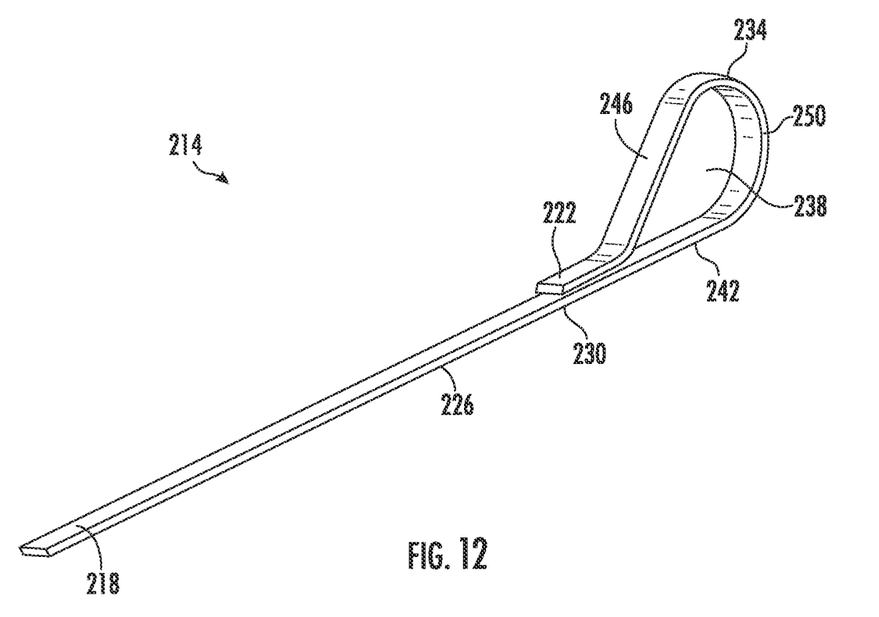
FIG. 12 is a perspective view of a tip for fish tape, according to an embodiment.

As shown in FIG. 12, a looped end 214 of a metal fish tape includes a first end 218 which is an extension of the length of fish tape, an opposite side end 222, and a body 226 between the first and second ends 218, 222. The second end 222 is looped around and secured to the body 226 at a secured point 230 to define a loop 234 forming a through-hole 238. The loop 234 has a first straight portion 242, a second straight portion 246 and a curved portion 250 between the two straight portions. The through-hole 238 is configured to permit a section of wire to pass through and be secured to the looped end 214.

Figure 13:
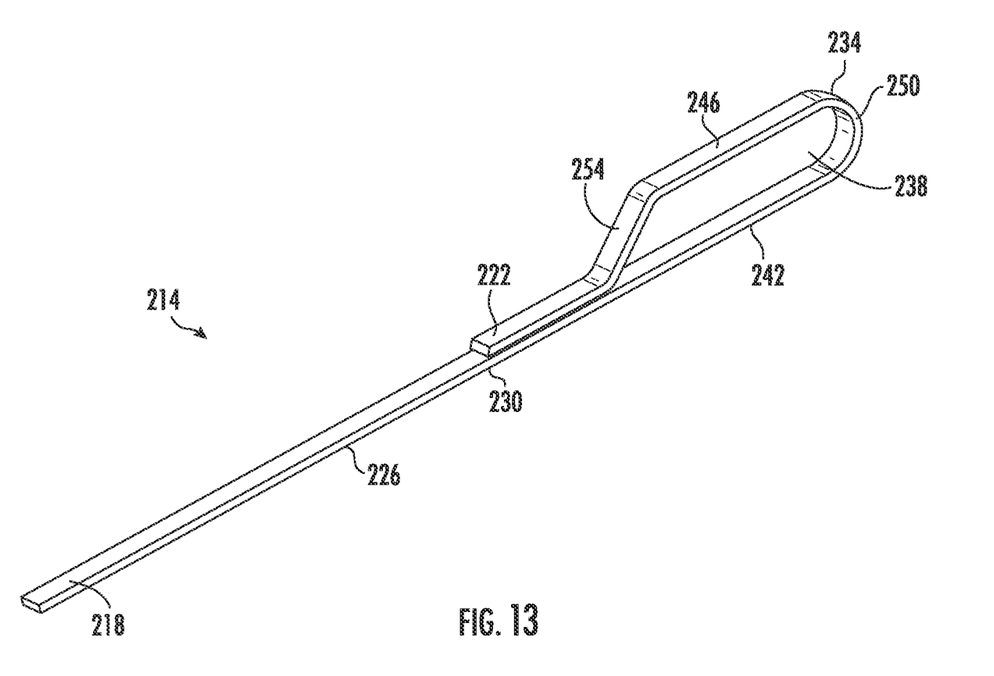
FIG. 13 is a perspective view of an embodiment of a tip for fish tape, according to an embodiment.
Figure 14:
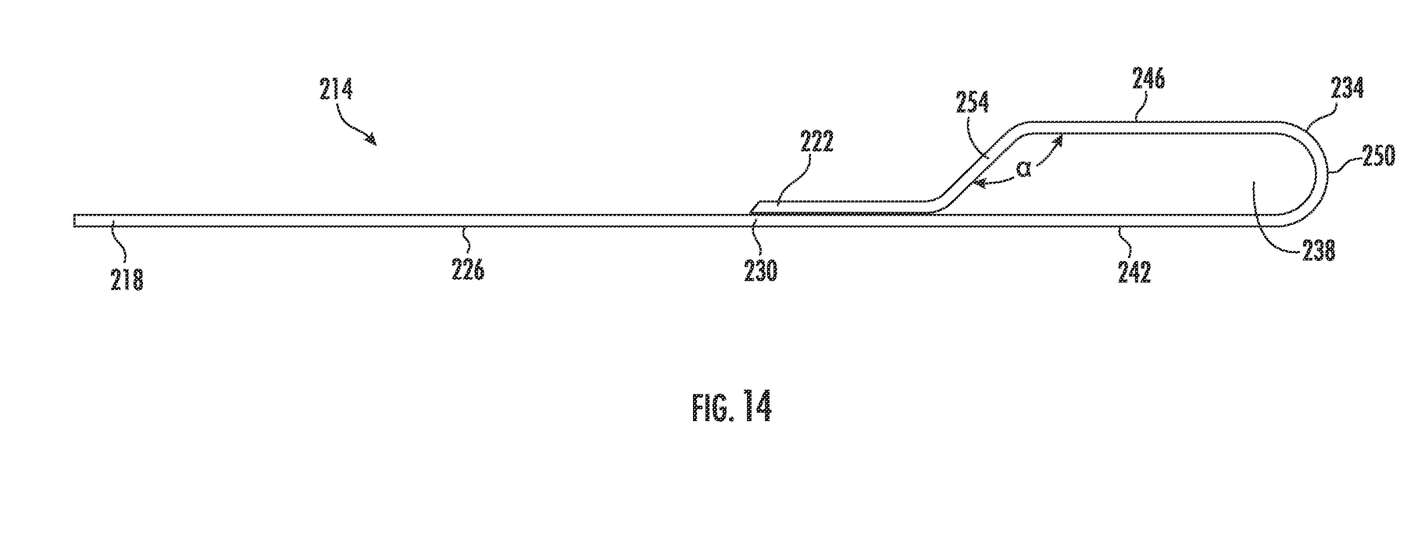
FIG. 14 is a side plan view of the tip of FIG. 13, according to an embodiment.

In the illustrated embodiment, the second end 222 is secured to the body 226 at the secured point 230 with spot welding. However, in other embodiments, the second end 222 may be secured to the body 226 at secured point 230 with a fastener, such as a screw or rivet. Because the second end 222 is secured to the body 226 at secured point 230, the second end 222 does not come lose from the body 226, thereby preventing the loop 234 from becoming un-bent during use. As shown in FIGS. 13 and 14, in a second embodiment of looped end 214, the loop 234 includes a third straight portion 254 linked to the second straight portion 246, defining an obtuse angle α therebetween. Further, in the embodiment shown in FIGS. 13 and 14, the first and second straight portions 242, 246 are parallel to each other.

Although the disclosure has been described in detail with reference to certain preferred embodiments, variations and modifications exist within the scope and spirit of one or more independent aspects of the disclosure as described.

What is claimed is:
1. A fish tape reel comprising:
a housing defining an internal cavity, the housing comprising a central axis;
an outer wall;
a handle, the handle configured to rotate around the central axis of the housing;
a fish tape wound within the internal cavity; and
a fish tape tip coupled to an end of the fish tape, the fish tape tip comprising:
a tip longitudinal axis;
a first end coupled to the fish tape;
a second end opposite the first end along the tip longitudinal axis such that a distance between the first end and the fish tape is less than a distance between the second end and the fish tape;
a first leg and a second leg that extend parallel to the tip longitudinal axis and couple the first end to the second end;
a through-hole defined by the first and second ends and the first and second legs;
a polygonal portion located between the first end and the first and second legs, the polygonal portion comprising a plurality of flat faces that extend parallel to the tip longitudinal axis;
a tapered portion located between the polygonal portion and the first and second legs;
a first semi-circular portion defined by the first end;
a second semi-circular portion defined by the second end;
a first rounded edge defined by the first semi-circular portion;
a second rounded edge defined by the second semi-circular portion;
a third rounded edge defined by the first leg; and
a fourth rounded edge defined by the second leg;
wherein the through-hole is defined by the first, second, third and fourth rounded edges;
wherein the tapered portion tapers from having a first height to having a second height, the tapered portion tapering along the tip longitudinal axis in a direction from the polygonal portion toward the through-hole, the second height being less than the first height.

2. The fish tape reel of claim 1,
wherein the first semi-circular portion tapers from having the first height to having the second height.

3. The fish tape reel of claim 2, wherein the second height is the height of the first leg.

4. The fish tape reel of claim 2, wherein the polygonal portion is hexagonal.

5. The fish tape reel of claim 1, wherein the first rounded edge, second rounded edge, third rounded edge, and fourth rounded edge form one continuous rounded edge that extends an entire combined length of the first leg, the second leg, the first semi-circular portion, and the second semi-circular portion.

6. The fish tape reel of claim 1, further comprising a plurality of tabs, wherein the housing and the plurality of tabs define an internal cavity; and
    an inner annular portion located between the plurality of tabs and the outer wall.

7. The fish tape reel of claim 6, the housing comprising a first side shell and a second side shell, wherein the first side shell comprises a first subset of the plurality of tabs, and the second side shell comprises a second subset of the plurality of tabs.

8. A fish tape reel comprising:
    a housing defining an internal cavity, the housing comprising a central axis;
    an outer wall;
    a handle, the handle configured to rotate around the central axis of the housing;
    a fish tape wound within the internal cavity; and
    a fish tape tip coupled to an end of the fish tape, the fish tape tip comprising:
        a tip longitudinal axis;
        a first end coupled to the fish tape;
        a second end opposite the first end along the tip longitudinal axis such that a distance between the first end and the fish tape is less than a distance between the second end and the fish tape, an outer surface of the second end defining a rounded end;
        a first leg and a second leg that extend parallel to the tip longitudinal axis and couple the first end to the second end;
        a first semi-circular portion that defines a first rounded edge;
        a second semi-circular portion that defines a second rounded edge;
        a third rounded edge between the first semi-circular portion and the second semi-circular portion;
        a fourth rounded edge between the first semi-circular portion and the second semi-circular portion;
        a through-hole defined by the first, second, third and fourth rounded; and
        a tapered portion located between the second end and the first and second legs;
    wherein the tapered portion tapers from having a first height to having a second height, the tapered portion tapering along the tip longitudinal axis in a direction from the rounded end toward the through-hole, the second height being less than the first height.

9. The fish tape reel of claim 8 wherein the first semi-circular portion is defined by the first end;
    the second semi-circular portion is defined by the second end;
    the third rounded edge is defined by the first leg; and
    the fourth rounded edge is defined by the second leg.

10. The fish tape reel of claim 9, wherein the first rounded edge, second rounded edge, third rounded edge, and fourth rounded edge form one continuous rounded edge that extends an entire combined length of the first leg, the second leg, the first semi-circular portion, and the second semi-circular portion.

11. The fish tape reel of claim 8, further comprising a plurality of tabs, wherein the housing and the plurality of tabs define an internal cavity; and
    an inner annular portion located between the plurality of tabs and the outer wall.

12. The fish tape reel of claim 11, the housing comprising a first side shell and a second side shell, wherein the first side shell comprises a first subset of the plurality of tabs, and the second side shell comprises a second subset of the plurality of tabs.

13. The fish tape reel of claim 8, the fish tape tip further comprising a polygonal portion located between the first end and the first and second legs, the polygonal portion comprising a plurality of flat faces that extend parallel to the tip longitudinal axis;
    wherein the rounded end has a half-spherical shape.

14. A fish tape reel comprising:
    a housing defining an internal cavity, the housing comprising a central axis;
    an outer wall;
    a handle, the handle configured to rotate around the central axis of the housing;
    a fish tape wound within the internal cavity; and
    a fish tape tip coupled to an end of the fish tape, the fish tape tip comprising:
        a tip longitudinal axis;
        a first end coupled to the fish tape;
        a second end opposite the first end along the tip longitudinal axis such that a distance between the first end and the fish tape is less than a distance between the second end and the fish tape;
        a first leg and a second leg that extend parallel to the tip longitudinal axis and couple the first end to the second end;
        a first semi-circular portion that defines a first rounded edge;
        a second semi-circular portion that defines a second rounded edge;
        a third rounded edge between the first semi-circular portion and the second semi-circular portion;
        a fourth rounded edge between the first semi-circular portion and the second semi-circular portion;
        a through-hole defined by the first, second, third and fourth rounded edges; and
        a tapered portion located between the first and second ends;
    wherein the tapered portion tapers from having a first height to having a second height along the tip longitudinal axis in a first direction from the first end to the first and second legs, and the tapered portion tapers from having the first height to having the second height along the tip longitudinal axis in a second direction from the second end to the first and second legs, the second height being less than the first height.

15. The fish tape reel of claim 14 wherein the first semi-circular portion is defined by the first end;
    wherein the second semi-circular portion is defined by the second end; and
    wherein the second semi-circular portion tapers along the tip longitudinal axis in the second direction from having the first height to having the second height.

16. The fish tape reel of claim 15, wherein the second end comprises a portion of a sphere, and wherein the first height is equal to a diameter of the portion of a sphere and the second height is the height of the first leg.

17. The fish tape reel of claim 15, wherein the first semi-circular portion tapers from having the first height to having the second height along the tip longitudinal axis in the first direction.

18. The fish tape reel of claim 14, the fish tape tip further comprising a polygonal portion located between the first end and the first and second legs, the polygonal portion comprising a plurality of flat faces that extend parallel to the tip longitudinal axis.

19. The fish tape reel of claim 14, further comprising a plurality of tabs, wherein the housing and the plurality of tabs define an internal cavity; and
   an inner annular portion located between the plurality of tabs and the outer wall.

* * * * *